Nov. 19, 1935.   H. D. FLEGEL   2,021,626
AGITATOR FOR DRINK MIXERS
Filed April 11, 1932   2 Sheets-Sheet 1

Inventor
H. D. Flegel

Nov. 19, 1935.  H. D. FLEGEL  2,021,626
AGITATOR FOR DRINK MIXERS
Filed April 11, 1932  2 Sheets-Sheet 2
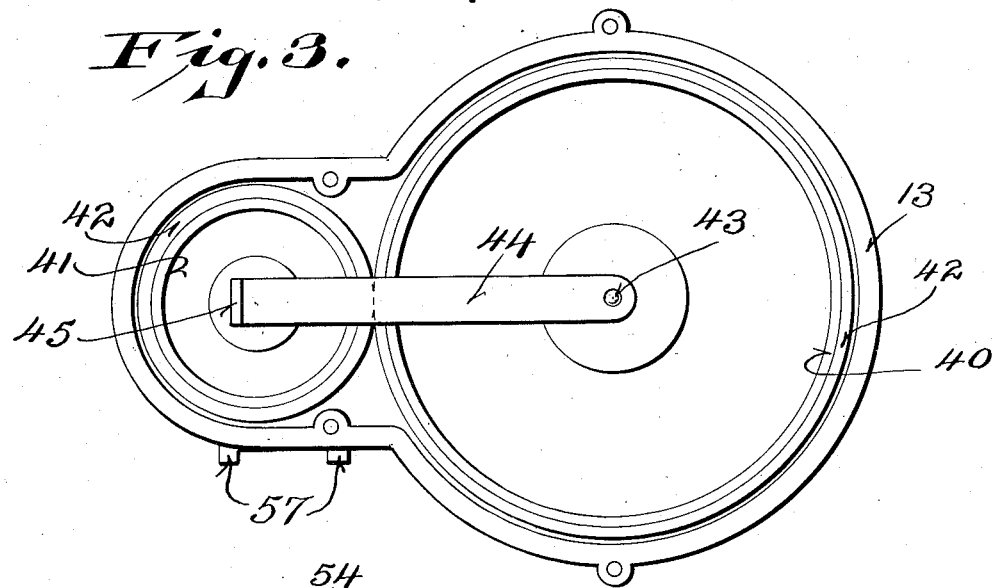
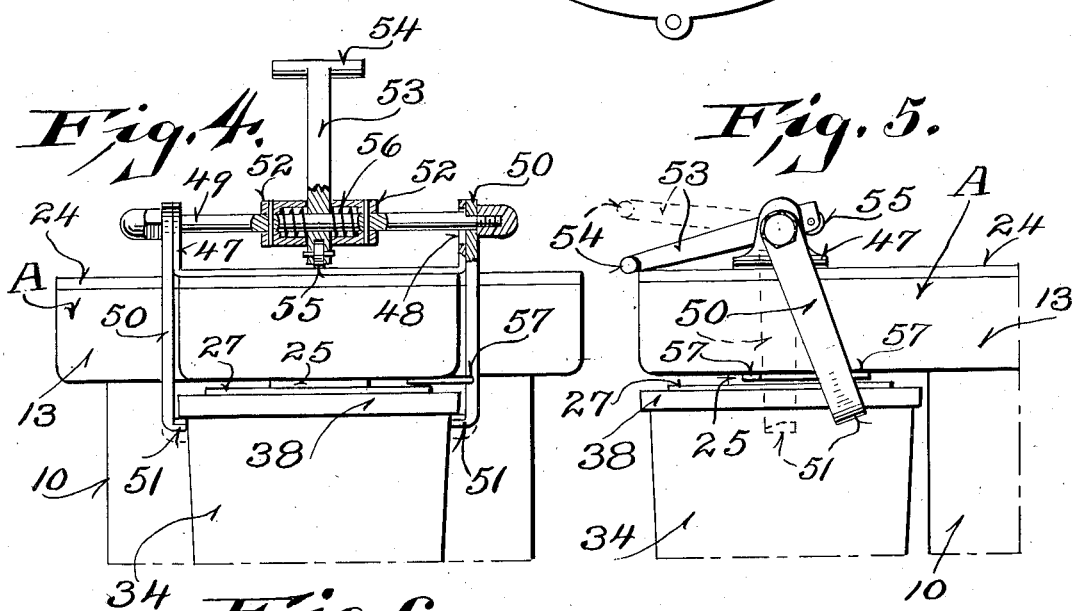
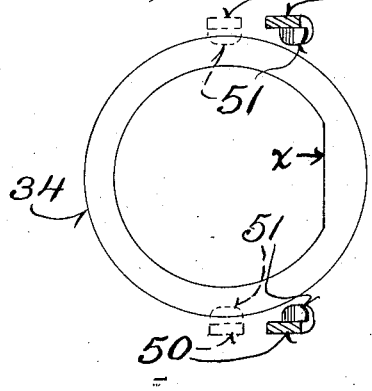
Inventor
H. D. Flegel
By
Attorneys Patented Nov. 19, 1935

2,021,626

UNITED STATES PATENT OFFICE 2,021,626

AGITATOR FOR DRINK MIXERS

Harrison D. Flegel, Racine, Wis.

Application April 11, 1932, Serial No. 604,581

6 Claims. (Cl. 259—108)

This invention relates to devices of the type generally employed at soda fountains and like places, for mixing different kinds of drinks, such as milk shakes and the like.

One of the primary objects of my invention is the provision of novel means for operating the drink agitator from the drive motor, whereby the agitator shaft will not only be driven at a high rate of speed, but one in which the drive is practically noiseless and which can be actuated by the operator in a convenient and expeditious manner.

Another important object of my invention is the provision of novel means for detachably associating the mixing cup with a supporting head, whereby irrespective of the speed of the agitator or dasher, the loss of the drink, through centrifugal action, will be entirely prevented.

A further salient feature of my invention is the provision of a depending ventilated head carried by the casing of the drink mixer for detachably receiving the drink mixing cup, the head having a gasket for liquid-tight connection, with the mixing cup, means being provided for drawing the cup into locking relation with the gasket and for operatively connecting the motor with the agitator or dasher shaft.

A further object of my invention is the provision of novel means for driving a drink mixer agitating or dasher shaft at a high rate of speed from a drive motor, the motor shaft carrying a noiseless gear for engagement with a similar gear of smaller diameter secured to the dasher shaft, with means for moving the motor and its gear for bringing the same into and out of driving relation with the gear on the dasher shaft.

A further object of my invention is the provision of a swinging and vertically movable yoke carried by the casing of the drink mixer for moving the mixing cup vertically on the supporting head for bringing the gasket into intimate contact with the mixing cup, a novel operating handle being provided for actuating the yoke, the handle being also provided with means for bringing about the connection of the drive between the motor and the agitating or dasher shaft.

A still further object of my invention is to provide an improved drink mixing device of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 3 is a top plan view of the improved drink mixer, with the top plate and its associate parts removed therefrom, illustrating the type of drive employed between the motor and the drink mixing shaft;

Figure 4 is a fragmentary end elevation, with parts thereof broken away and in section, illustrating the means for locking the drink mixing cup in operative position and for bringing about the drive between the motor and the drink mixing shaft;

Figure 5 is a view similar to Figure 2 illustrating the handle in its inoperative position for permitting the release of the drink mixing cup and for disconnecting the drive from the motor and the mixing shaft;

Figure 6 is a detailed sectional view looking down on the drink mixing cup and showing the yoke in full lines in its inoperative position and in dotted lines in its operative position.

Figure 1:
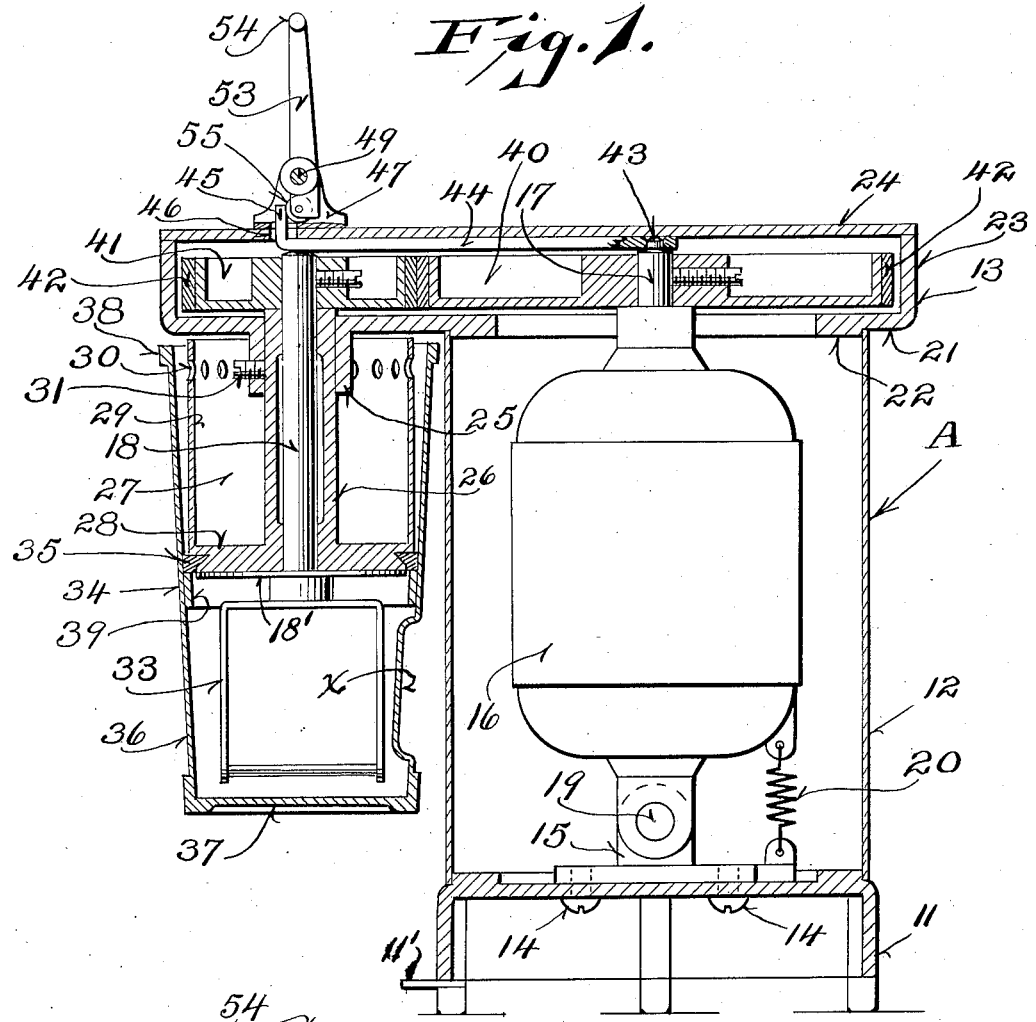
Figure 1 is a vertical section through my improved drink mixing device, showing the operating handle in its raised elevated position for holding the drink mixing cup in liquid-tight contact with the supporting head and the motor in driving relation with the drink mixing shaft or agitator.
Figure 2:
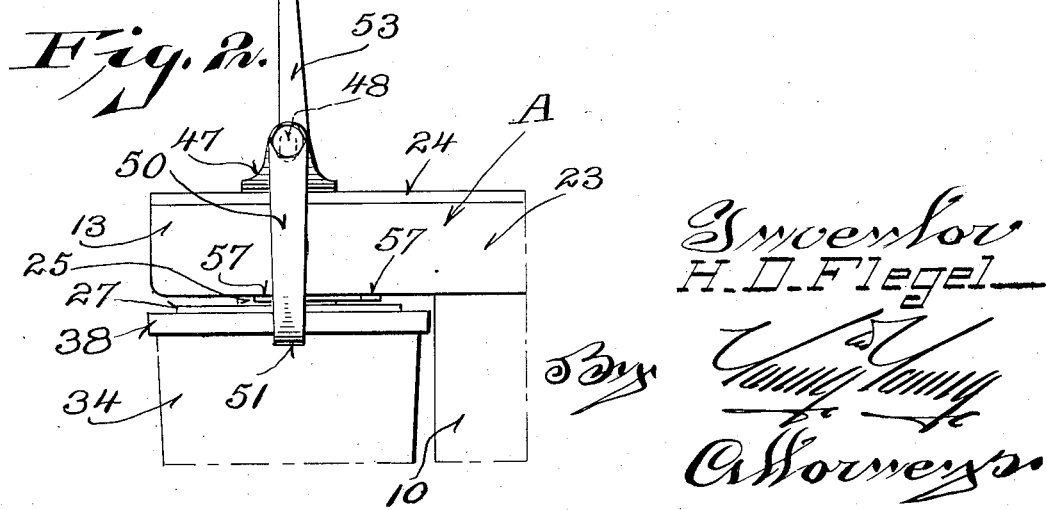
Figure 2 is a fragmentary side elevation illustrating the means for holding the drink mixing cup in proper position and for bringing about the drive between the motor and the drink mixing shaft or agitator.

Referring to the drawings in detail, wherein similar reference characters designate corresponding parts throughout the several views, the letter A generally indicates my improved drink mixer which comprises a supporting base 11 which can be in the nature of a casting, if so desired. Suitably fitted on the base 11 is the casing side wall 12, which can be of a cylindrical shape, if preferred. The upper end of the side wall 12 is closed and carries the gear casing housing 13.

Suitably connected to the base 11 by means of screws 14, or other fastening elements, is a base block 15 to which is connected an electric motor 16 of the desired horse power, or fractional horse power. The armature shaft 17 of the motor extends into the gear housing 13, as clearly shown in Figure 1 of the drawings. The motor 16 is mounted within the casing in such a manner that the same is free to give laterally slightly, so as to bring about the drive between the armature shaft 17 and the drink mixer shaft 18, which will be hereinafter more fully described.

As shown, I have provided a pivot connection 19 between the motor 16 and the base block 15 for allowing the lateral swinging of the motor. A contractile coil spring 20 is connected to one side of the motor 16 to the base block 15 and this spring 20 normally functions to hold the motor in a predetermined position for disconnecting the drive between the armature shaft 17 and the drink mixing shaft 18.

The gear housing 13 embodies a lower wall 21, which is provided with a boss 22 for fitting within the side wall 12 of the casing. The bottom wall 21 carries the side walls 23 and a top wall or cover plate 24 is detachably connected with the side walls 23 by the use of any preferred type of fastening elements. Depending from the bottom wall 21 of the gear housing 12, at one side of the casing wall 12, is a depending sleeve or bearing boss 25, which receives the axially disposed hollow bearing sleeve 26 of the supporting head 27. This supporting head 27 has formed on the lower end of the bearing sleeve 26, a flat wall 28, which in turn carries the substantially cylindrical outer wall 29.

The upper end of the outer wall 29 of the supporting head 27 is provided with ventilating openings 30, which also serve the purpose of facilitating the adjustment of the screw 31 which extends through the supporting sleeve or boss 25 for engagement with the bearing sleeve 26 of the head 27. Thus, the head 27 is detachably connected with and depends from the gear casing 13. Rotatably mounted within the bearing sleeve 26 is the agitating or dasher shaft 18. The lower end of this dasher shaft or agitating shaft 18 has connected therewith, the beater, agitator or dasher 33 for mixing the drink in the mixing cup, or vessel 34. The agitator 33 is preferably constructed in the form of a yoke provided with spaced depending arms connected at their lower ends by means of a transverse brace, thus providing a wide spread with resultant increase in the efficiency of the mixing operation. The lower end of the supporting head 26 has associated therewith, an annular compressible gasket 35 for contact with the inner face of the drink mixing cup 34, for a purpose, which will also be later set forth.

In order to clean the lower face of the supporting head 27, after the mixing operation has been completed, a wiper 18' is secured to the agitator shaft 18 and engages the lower face of the head. Obviously, as the agitator shaft continues to rotate upon withdrawal of the receptacle 34 from the supporting head, the wiper will throw such liquid, as may adhere to the head, laterally to the sides of the receptacle, thus eliminating dripping after the receptacle has been removed.

The mixing cup 34 is of a special construction and is particularly adaptable for use in connection with my drink mixing machine. As shown, the same includes the side wall 36 which gradually tapers toward its lower end and carries the substantially flat bottom wall 37. The upper end of the side wall 36 carries an external rim, or annular flange 38. At a point intermediate its ends, the interior of the cup is provided with an annular stop shoulder 39 which forms a seat for the gasket 35, as will also be later described.

The armature shaft 17 of the motor has secured thereto a relatively large drive wheel 40, which is arranged within the gear housing 13. This drive gear 40 is adapted to be brought into and out of driving relation with a relatively small driven gear 41, detachably secured to the upper end of the agitating shaft 18.

While any desired type of gear can be employed, I preferably provide the peripheries of the gears 40 and 41 with rubber or other friction tires 42. The extreme upper end of the armature shaft 17 carries a reduced knob 43, which is loosely received within an operating link 44, slidably mounted within the gear housing 13. If desired, any preferred type of guides can be provided for this link. The outer end of the link is provided with a rightangularly disposed arm 45 which extends through a slot 46, formed in the cover plate 24 of the gear housing.

Secured to the top face of the cover plate 24 directly above the agitating shaft 18 is a substantially U-shaped supporting bracket 47, the lugs of which are provided with slots 48, in which are loosely mounted, a cross shaft 49. The cross shaft 49 has secured thereto in any desired manner, for movement therewith, depending locking or yoke arms 50. The lower terminals of the locking arms 50 are provided with inwardly directed feet 51 for gripping engagement with the rim 38 of the drink mixing cup 34. Mounted on the central portion of the cross shaft 46 is a hollow housing 52, and this housing is keyed to the cross shaft for movement therewith. Extending through the housing is an operating handle 53 and the operating handle 53, at a point intermediate its ends, is rotatably mounted on the cross shaft 49. The upper end of the operating handle 53 carries a hand grip 54, while the lower end of the handle carries an anti-friction roller 55 for engagement with the upper face of the U-shaped bracket 47.

If desired, the upper face of the bracket can be bevelled, so as to faciliate the movement of the roller 55 thereover, and for bringing about the raising of the operating handle and the cross shaft 46. In order to bring about a frictional slip connection between the operating handle 53 and the cross shaft 49, relatively heavy expansion springs 56 are mounted within the hollow casing 52. These springs are placed on opposite sides of the operating handle 53 and bear against the same and the opposite ends of the hollow housing 52. Thus, under normal conditions, any movement of the handle 53 will be transmitted to the cross shaft 49.

To limit the swinging movement of the locking or yoke arms 50, I provide spaced stop lugs 57, and these lugs are carried by the lower face of the gear housing 13. The lugs are mounted on opposite sides of one locking arm and limit the swinging movement thereof in both directions. In operation of my improved device, the drink to be mixed is placed within the mixing cup 34, after which the cup is slipped on the hollow head 27 and the gasket 35 thereof engages the inner face of the mixing cup. The operating handle 53 is now swung to the dotted line position shown in Figure 5 of the drawings, and this movement of the handle will rock the cross shaft 49 and bring the locking arms 50 into a vertical position, with the engaging feet 51 thereof directly below the rim 38 of the drink mixing cup.

Upon further swinging movement of the handle 53 to a vertical position, the roller 55 of the handle will ride upon the upper face of the U-shaped supporting bracket 47 which will raise the cross shaft 49 and thus draw up on the locking arms 50, causing the lifting of the mixing cup 34 to a raised position. The upward lifting of the mixing cup will seat the gasket on the shoulder 39 and effectively bring about a liquid seal between the mixing cup and the supporting head 27, so as to prevent splashing of the drink being mixed. As the handle 53 is moved to its vertical position, the roller 55 will engage the arm 45 on the link 44, and thus draw the motor 16 and its gear 40 laterally, until the gear 40 is in driving contact with the gear 41. This action is against the tension of the spring 20. Due to the size of the gears 40 and 41, the shaft 18 will be rapidly rotated and thus the drink will be quickly and efficiently mixed. After the drink has been mixed, the handle is swung back to its normal position, as shown in full lines in Figure 5 of the drawings, which will release the drink mixing cup, and allow the spring 20 to return the motor and its gear to their normal position for disconnecting the drive to the drink mixing shaft. It will be noted that the initial movement of the operating handle will first release the drive and will then release the cup.

To insure thorough cleaning of the supporting head prior to the complete removal of the receptacle after the mixing operation, the base 11 is provided with an offset lip 11', which engages the bottom of the receptacle as the same is vertically withdrawn from the supporting head, thus obstructing the removal operation and making it necessary to twist the cup in order to completely withdraw the same from the machine. The lip 11' is so positioned that withdrawal movement of the cup or receptacle is obstructed prior to exposure of the wiper above the upper lip of the cup. This momentary obstruction prevents a quick removal of the cup and insures complete cleaning of the bottom face of the supporting head, which, as stated, eliminates subsequent dripping upon the counter.

From the foregoing description, it can be seen that I have provided an exceptionally simple and durable device for bringing about the quick and efficient mixing of a drink with a minimum expenditure of time and energy on the part of the operator.

The construction of the supporting head 27 is such that the same can be readily cleaned at any time, and a light and durable arrangement is provided for.

Attention is directed to the fact that the mixing cup, as shown in Figures 1 and 6, is provided with a depression X, which depression constitutes a baffle plate, it being understood that the baffle may be in the form shown or it might embody a rib of any desired formation. The baffle arrangement shown however is preferable due to the fact that there is no opportunity for settlement of foreign matter in crevices and hence is more sanitary in its function.

Changes in details may be made without departing from the spirit or the scope of this invention, but what I claim as new is:

1. In a drink mixing device, a drive motor, a depending supporting head arranged at one side of the motor, a drink mixing shaft rotatably mounted in said head, a beater secured to the lower end of the shaft and depending below said head, a drink mixing cup in suspended position removably engaging the head, and means for engaging the lip of the cup and simultaneously locking the cup on the head and for effecting a driving connection between the motor and mixing shaft.

2. In a drink mixing device, a drive motor, a depending supporting head arranged at one side of the motor, a mixing shaft rotatably mounted in said head, a driving connection between the motor and the mixing shaft, a compressible gasket carried by the outer periphery of the supporting head, a drink mixing cup having an internal shoulder and removably engaging the mixing head, and means engaging the lip of the cup for moving the cup into a raised locked position suspended on the head with the gasket seated against said internal shoulder, the head forming a closure for the receptacle.

3. In a drink mixing device, a drive motor, a depending supporting head arranged at one side of the motor having a peripheral compressible gasket, a rotatable mixing shaft supported by said head, a beater secured to the shaft and depending below said head, a drive connection between the motor and the mixing shaft, a removable drink mixing cup having an annular internal shoulder receiving said head, the upper end of the mixing cup being provided with a rim, an operating handle and depending clamping arms actuated from the handle for engaging the rim of the cup for moving the cup to a raised locked position with the gasket against said shoulder.

4. In a drink mixing device, a drive motor, a depending supporting head arranged at one side of the drive motor, a rotatably driven shaft mounted within the supporting head, a beater secured to the lower end of the shaft and depending below the head, a driven mixing cup removably mounted on the head having an internal shoulder, a flexible gasket carried by the head for seating against said shoulder, means including friction gears for operatively connecting the motor with the mixing shaft, a U-shaped supported bracket arranged above the head, a cross shaft rockably carried by the bracket, an operating handle operatively connected with the cross shaft, depending locking arms secured to the cross shaft, an annular supporting rim formed on the upper end of the mixing cup, and inwardly directed feet carried by the lower ends of the arms for engaging the rim.

5. In a drink mixing device, a drive motor, a depending supporting head arranged at one side of the motor, a mixing shaft rotatably mounted within said head having a beater disposed below the head, means including friction gears for operatively connecting the motor with the mixing shaft, a mixing cup removably fitted on the head having an internal shoulder and an external rim, a compressible gasket carried by the head for engaging the internal shoulder, a supporting bracket mounted above the head, a cross shaft rockably and slidably mounted within the bracket, an operating handle rotatably mounted on the cross shaft at a point intermediate its ends having a roller on its lower end for engaging the bracket, depending clamping arms carried by the cross shaft having inwardly directed feet for engaging on the mixing cup and means for setting up a frictional contact between the handle and the cross shaft, and means for limiting the swinging movement of the locking arms in both directions.

6. In a drink mixing device, a drive motor, a supporting base, means rockably connecting the drive motor on the supporting base, a drive wheel connected with the motor, a supporting head arranged at one side of the motor, a mixing shaft rotatably mounted in the supporting head, a beater on the lower end of the mixing shaft extending below the head, a driven wheel secured to the mixing shaft and adapted to be engaged by the drive wheel when the motor is shifted laterally, resilient means normally holding the motor in a predetermined position with the drive wheel out of engagement with the driven wheel, a mixing cup removably fitted on the supporting head having an annular rim, a shift link connected with the motor having a right angularly disposed arm, a U-shaped supporting bracket arranged above the link, a cross shaft slidably and rockably carried by the bracket, clamping arms connected with the cross shaft for engaging the rim of the mixing cup, an operating handle rockably mounted at a point intermediate its ends on the cross shaft, means frictionally connecting the handle with the cross shaft, means for limiting swinging movement of the clamping arms in both directions, the lower end of the operating handle being adapted to engage the bracket and the arm of the shift link.

HARRISON D. FLEGEL.